Jan. 28, 1930.    L. D. LOVEKIN    1,744,977
TEMPERATURE CONTROLLED RELIEF VALVE FOR DOMESTIC HOT WATER TANKS
Filed May 9, 1928
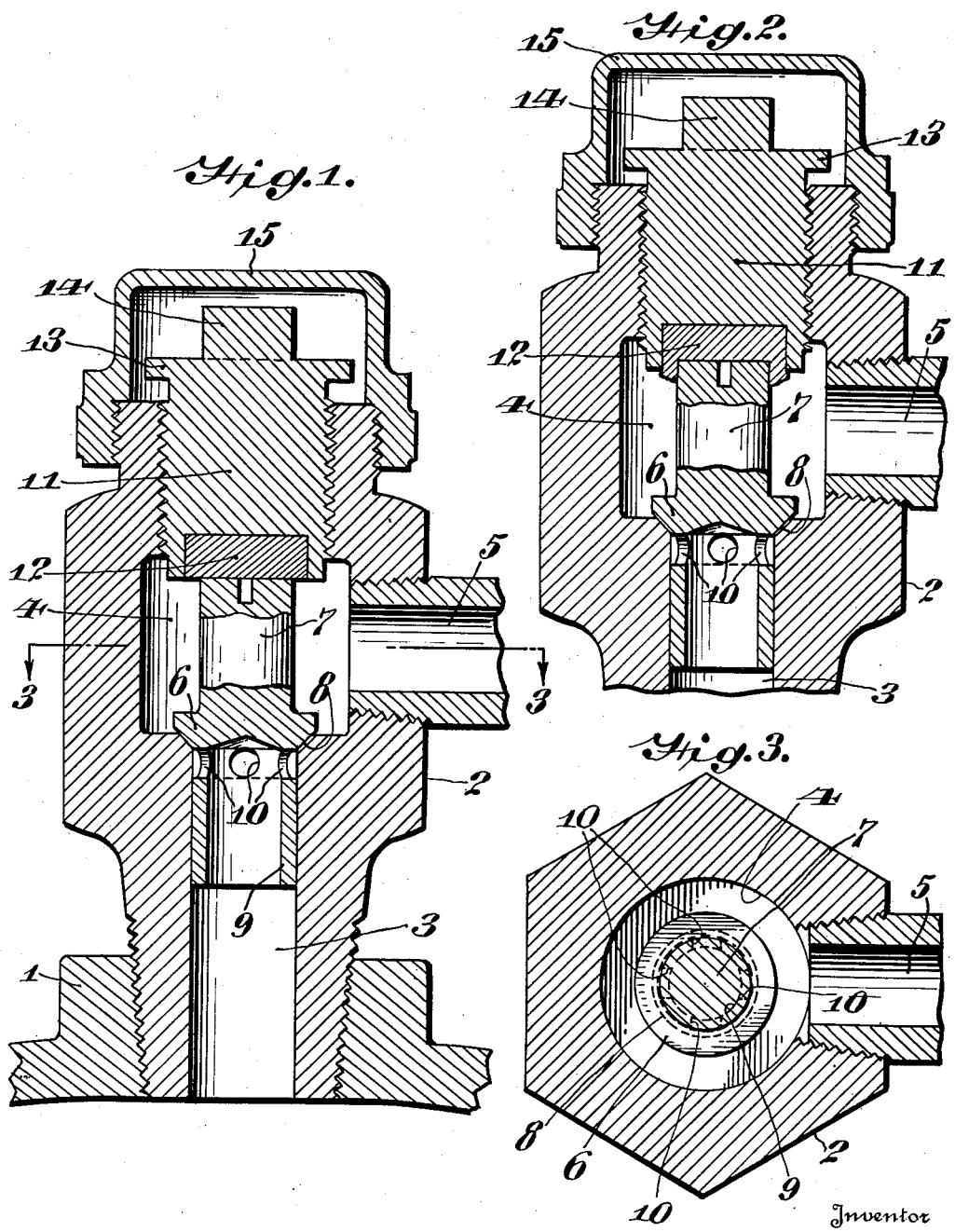
Inventor
Luther D. Lovekin
By Cyrus V. Anderson
Attorney Patented Jan. 28, 1930

1,744,977

UNITED STATES PATENT OFFICE

LUTHER D. LOVEKIN, OF WYNNEWOOD, PENNSYLVANIA

TEMPERATURE-CONTROLLED RELIEF VALVE FOR DOMESTIC HOT-WATER TANKS

Application filed May 9, 1928. Serial No. 276,251.

My invention relates to temperature controlled relief valves, and more particularly to relief valves which are of especial utility in affording the relief of water pressure in domestic hot water tanks to prevent the genration of steam therein. It is customary to provide in devices of this character a fusible disk which will permit the escape of hot water when a predetermined temperature is reached. Said disk is usually so positioned as to permit direct contact therewith of the water or fluid in the hot water tank or boiler to which the device is connected. But it has been found that the fusible metal after long periods of use becomes coated with a deposit of scale which is formed from impurities in the water, which scale is of sufficient strength to render the disk inoperative. It therefore is an object of my invention to provide a relief valve of novel construction in which the fusible disk is normally positioned out of contact and isolated from the hot water contained in the hot water tank or boiler to which the valve is attached.
In the devices of the character indicated the practice has been to employ pressure controlled relief valves which are normally biased to closed position by means of a spring or weight. But it has been found that a pressure relief valve the operation of which depends upon a spring or weight. But it has been found that a pressure relief valve the operation of which depends upon a spring or weight, cannot possibly relieve the pressure of the fluid control at such a time as will prevent the occurrence of dangerously high temperatures. I overcome this difficulty by providing a valve which is responsive to the temperature condition existing in the hot water tank to which it is attached irrespective of the degree of pressure therein and which will operate to prevent the development of too high a temperature in the hot water tank which otherwise would result in the production of steam.

Another object of my invention is to provide a relief valve the body of which consists of a relatively large mass of metal whereby heat will be efficiently conducted to the fusible disk which controls the operation of the valve and which is positioned at the outlet side of the valve in the said body.

A further object of my invention is to provide a relief valve of novel construction which is adapted to relieve the pressure in the hot water tank to which it is attached when the temperature of the water reaches a critical value without materially impairing the fusible disk which controls the operation of the valve, thereby enabling the valve to be readjusted for further use without the necessity of replacing the fusible disk.

Other objects and advantages of the invention will be set forth in the following description or will be apparent from such description.

In order to more fully comprehend the principle of the invention reference may be had to the accompanying drawing in which I have illustrated one convenient embodiment thereof. But it is to be understood that the invention is susceptible of embodiment in other forms of construction than that shown and that changes in the details of construction may be made without departing from the spirit of the invention as defined in the appended claims.

In the drawing:

Fig. 1 represents a transverse sectional view of a valve embodying the invention;

Fig. 2 is a transverse sectional view similar to that shown in Fig. 1 but showing the parts of the device after the valve has been permitted to operate and has been readjusted for further use; and

Fig. 3 is a view in cross section taken on the line 3—3 of Fig. 1.

Referring to the drawing, the numeral 1 designates the shell of a boiler or hot water tank which may form part of a domestic hot water system with which the valve of my invention designated generally at 2 has screw-threaded engagement, as shown. The said valve is provided with an inlet opening or passageway 3 which communicates with the interior of said tank and which opens into a central valve chamber 4, the said valve chamber discharging to the atmosphere or to waste through an outlet nipple 5, screw-threadedly engaging the valve 2. The flow of fluid through the passageway 3 is controlled by means of a valve 6 having a stem 7 formed thereon engaging a seat 8 formed at the inner end of the passageway 3. The valve is provided with a tubular skirt portion 9 having openings 10 formed therein, which skirt slidably fits the interior of the passageway 3 to guide the valve in its movements to and from the said seat in known manner.

The valve is normally retained in closed position by means of a plug 11 screw-threadedly engaging an opening formed in the valve body in axial alinement with the passageway 3 which plug is adapted to be moved toward and from the free end or stem 7 of the valve 6, as will be obvious. The said plug is recessed at its inner end to receive a disk of fusible metal 12 having the desired melting point. When the plug 11 is threaded toward the valve in the direction in which the valve seats the fusible disk is brought into engagement with the outer end of the valve stem 7 and the valve is forced to its seat, thereby preventing the escape of fluid from the hot water tank to which the valve is attached.

The outer end of the plug 11 is provided with an annular flange or stop 13 the purpose of which is to prevent the plug 11 from being screwed inwardly of the valve body to such an extent as to hold the valve in closed position when the fusible disk has been omitted. The said plug is further provided with a wrench hold 14 to permit ready and quick adjustment thereof. A cap 15 having screw-threaded attachment with the valve body 2 as shown is adapted to conceal the outer end of the plug 11 to prevent tampering therewith.

The operation is as follows: When the valve has been attached to a hot water tank or boiler the valve member will have moved into contact with the valve seat. The fusible disk then will abut the outer end of the valve stem, the said plug and disk retaining the valve in closed position. In the event that the temperature of the water in the heater approaches a value which will be predetermined by the selection of the metal composing the disk 12, heat will be conducted to the fusible disk through the heavy mass of material of the valve body and through the plug 11 which carries the said disk. The conduction of heat to the fusible disk is further augmented by the valve and valve stem, the latter being of heavy mass. As a result the disk will soften slightly and the pressure of the fluid acting on the under side of the valve will force the valve upwardly, thus permitting the escape of hot water. By constructing the valve body and valve stem of heavy mass the heat is efficiently conducted to the fusible plug, thereby subjecting the said plug to substantially the same temperature as that of the water in the hot water tank.

Ordinarily the temperature at which the valve opens will not be sufficiently high to cause the disk 12 to melt to any great extent but will merely permit the valve to be lifted a short distance from its seat to effect the release of pressure which results from heating the water to too high a temperature. When the valve has been so moved the extent of opening thereof ordinarily will be sufficient to prevent the generation of steam and any consequent damage to the heating system by allowing more water to escape than can be heated by a heater attached to the hot water tank. In the event that an abnormal amount of heat is applied to the water heater or boiler the abnormal temperature of the boiler will cause complete fusion of the disk 12, thus permitting the valve to open to the fullest extent. However, if the temperature attained in the heater or boiler is not sufficient to completely fuse the metal of the disk the disk will only soften sufficiently to permit the valve to open slightly, a small quantity of the fusible metal being squeezed out of the recess in the plug 11, which metal is washed away by the escaping water. After the valve has so operated it can be adjusted for further use by screwing the plug 9 inwardly to seat the valve, as shown for example in Fig. 2. In the said figure the disk 12 is shown as being thinner than the disk in Fig. 1, a portion thereof having been removed by the erosion of the escaping water as described above. Thus the valve may operate any number of times without materially impairing the fusible disk, making it unnecessary to replace the said disk after each operation of the valve. A material saving in the servicing of a relief valve of this character is thereby effected.

By providing the shoulder 13 on plug 11 it is impossible to hold the valve in closed position unless the disk is inserted, thus making the device fool-proof. Were this shoulder or stop not provided it would be possible to seat the valve and prevent the relief of pressure in an emergency, which might result in damage to the heating system.

It now will be apparent that I have provided a valve of novel construction which is efficient in use and which may be manufactured economically. By eliminating the use of springs I am able to obtain accuracy in the operation of my temperature controlled relief valve such as has not been possible heretofore and to produce a valve which comprises few parts and one which may be used repeatedly without requiring repair.

Having thus described my invention what I claim and desire to secure by Letters Patent is:

1. A temperature controlled relief valve adapted to be connected to a hot water tank comprising a valve body, inlet and outlet passageways formed in said body, a valve member adapted to control the flow of fluid through said passageways, and a fusible element for controlling the operation of said valve, said element being positioned in said valve body on the outlet side of said valve.

2. A temperature controlled relief valve adapted to be connected to a hot water tank comprising a valve body having a valve engaging a valve seat therein, a fusible element for normally retaining said valve in closed position, and means ofr adjustably mounting said element in operative relation to said valve whereby the valve will be permitted to operate when the temperature of the fluid which the valve is adapted to control approaches a predetermined value without materially impairing the said element, the said means being adapted to effect readjustment of the said element and valve for further use after operation thereof.

3. A temperature controlled relief valve adapted to be connected to a hot water tank comprising a valve seat and a valve adapted to engage said seat, a fusible element for normally retaining said valve in engagement with the seat, means for adjustably positioning said fusible element, and a stop for limiting the movement in one direction of said last mentioned means.

4. A temperature controlled relief valve adapted to be connected to a hot water tank comprising a valve seat and a valve adapted to engage said seat, a fusible element for normally retaining said valve in engagement with said seat, means for adjustably positioning said fusible element on the outlet side of said valve, and a stop for limiting the movement in one direction of said last mentioned means.

5. A temperature controlled relief valve adapted to be connected to a hot water tank comprising a valve body of relatively heavy mass, inlet and outlet passageways formed in said body, a valve member adapted to control the flow of fluid through said passageways, and a fusible element for controlling the operation of said valve, said element being positioned in said valve body on the outlet side of said valve.

6. A temperature controlled relief valve adapted to be connected to a hot water tank comprising a valve body of relatively heavy mass, inlet and outlet passageways formed in said body, a valve member having a stem thereon of relatively large diameter and heavy mass, said member being adapted to control the flow of fluid through said passageways, and a fusible element for controlling the operation of said member, said element being positioned on the outlet side of said valve member in contactual relation with said valve stem.

In testimony that I claim the foregoing as my invention I have hereunto signed my name this 7th day of May, A. D. 1928.

LUTHER D. LOVEKIN.